United States Patent [19]

Pitchford

[11] 4,221,473
[45] Sep. 9, 1980

[54] IMAGE EXPANDER FOR REAR-SCREEN PROJECTORS

[75] Inventor: Richard L. Pitchford, Wappingers Fall, N.Y.

[73] Assignee: The Singer Company, Stamford, Conn.

[21] Appl. No.: 961,305

[22] Filed: Nov. 16, 1978

[51] Int. Cl.³ .................... G03B 21/22; G03B 3/00
[52] U.S. Cl. ................................. 353/76; 353/78; 353/96; 353/101
[58] Field of Search ................. 353/27 R, 76, 78, 95, 353/96, 101

[56] References Cited

U.S. PATENT DOCUMENTS

| 2,878,718 | 3/1959 | Post | 353/76 |
| 2,933,978 | 4/1960 | Rosenthal | 353/78 |
| 3,692,398 | 9/1972 | Strauss | 353/76 |
| 3,876,298 | 4/1975 | Hickey | 353/95 |

Primary Examiner—Steven L. Stephan
Attorney, Agent, or Firm—Robert E. Smith; Charles R. Lewis; Edward L. Bell

[57] ABSTRACT

A slide projector located within a rear-screen projector has means therein for projecting images, contained on slides, onto a self-contained projection screen. Two lenses having different focal lengths are mounted within the projector housing and may alternatively be brought into the optical path for projecting slides, having different size formats, such that the projected image fills the projection screen.

15 Claims, 6 Drawing Figures

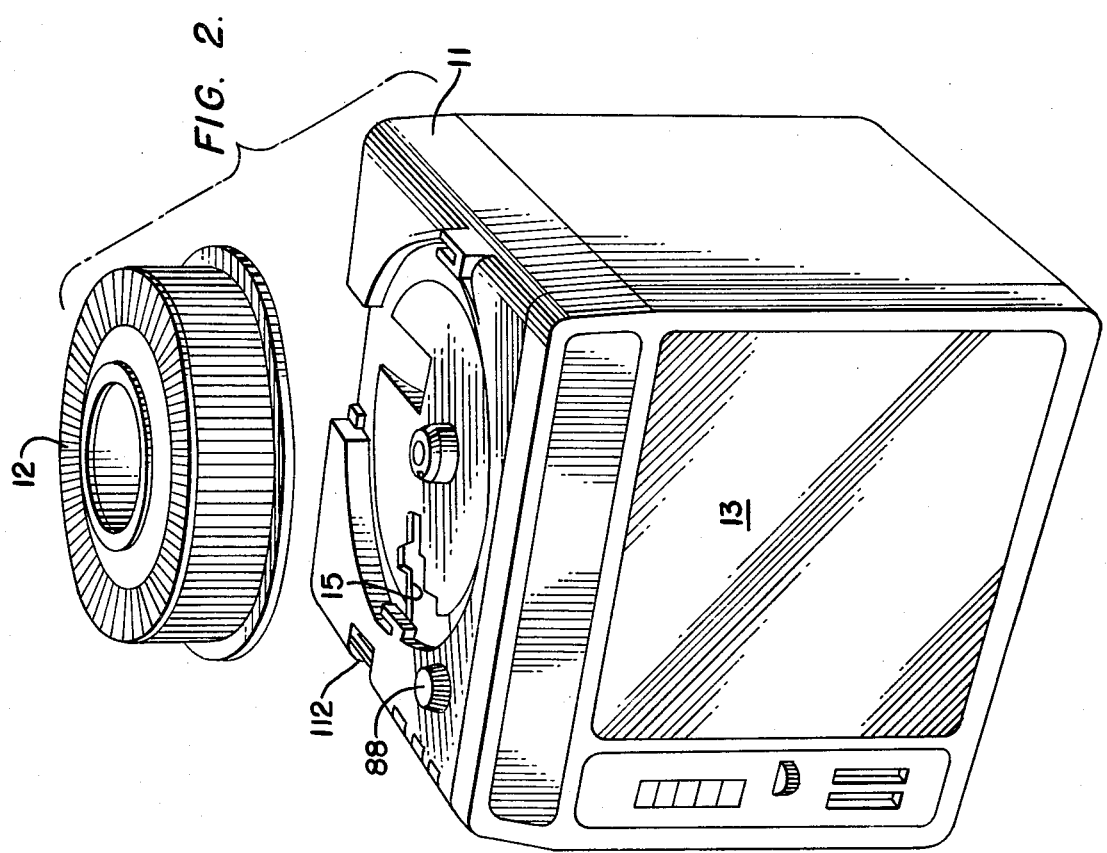
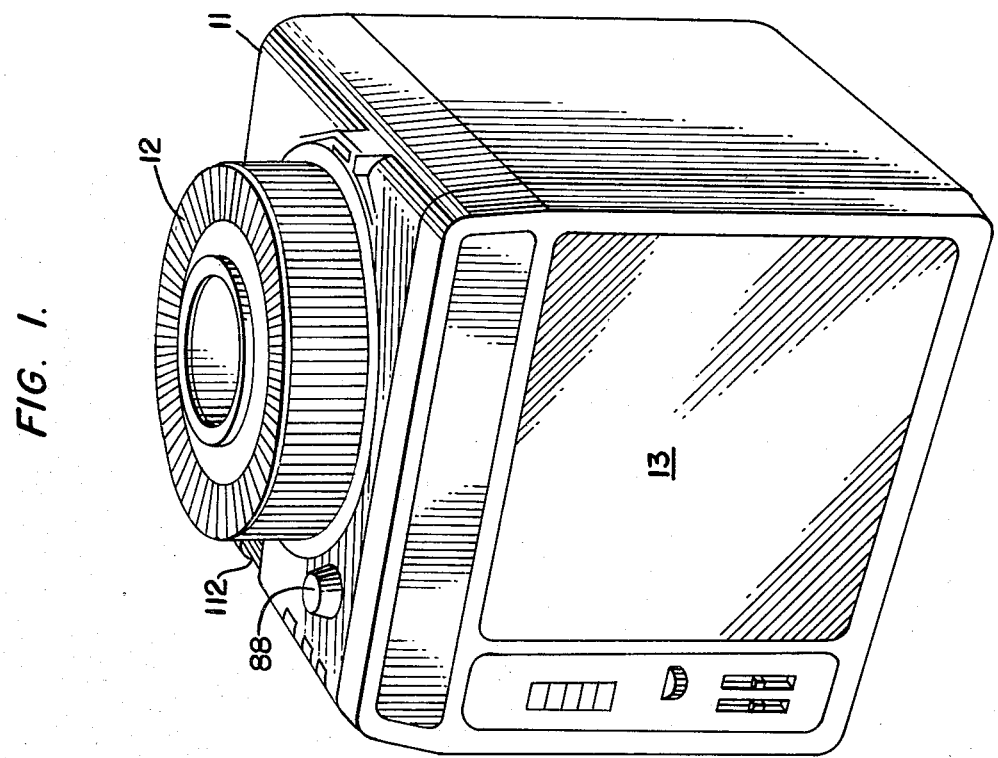

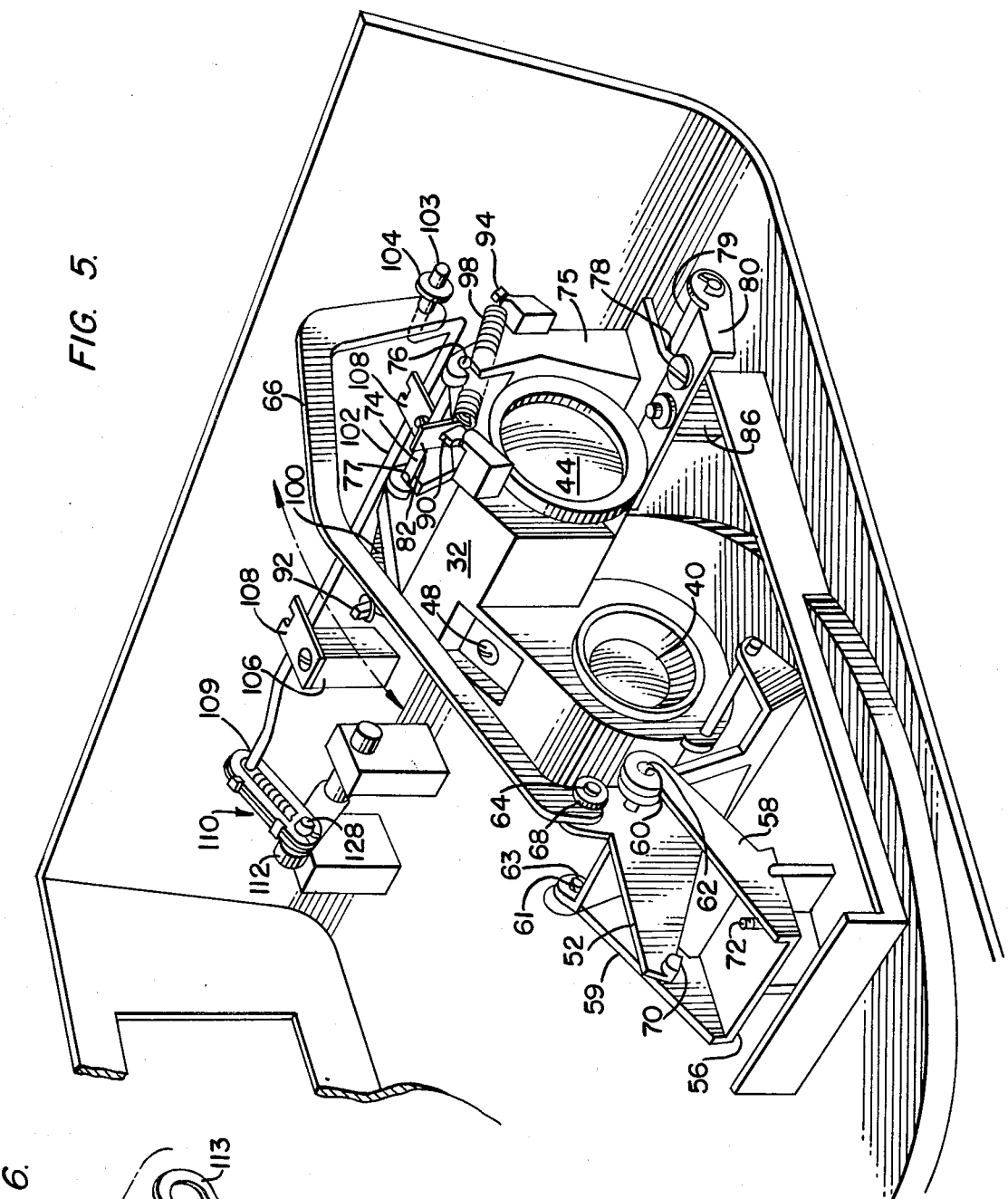

IMAGE EXPANDER FOR REAR-SCREEN PROJECTORS

BACKGROUND OF THE INVENTION

This invention relates to rear-screen projectors and more particularly to those projectors capable of selectively expanding a projected image such that the projection screen may be filled.

A rear-screen projector projects images contained on a slide onto a projection screen contained therein. Ideally, the slides used therewith are of a uniform size format for which the projector is designed. However, with the different size formats in the film used to make the slides, it is not unusual for the projector to be used with slides having a size format different from that for which the projector was designed. In the case where the slide size format is smaller, the projector is not able to fill the projection screen with the projected image. Also in viewing slides, it is sometimes desirable to be able to magnify a portion of the projected image for greater detail.

SUMMARY OF THE INVENTION

The object of this invention is to provide a rear-screen projector with the capability of selectively expanding the projected image for the purpose of both filling the projection screen and magnifying a portion of a projected image.

Another object of this invention is to provide image-expanding capabilities without the need to readjust the focus.

A further object of this invention is to provide image-expanding capabilities which exhibit satisfactory optical qualities without the need for expensive lenses.

These objects are achieved in a rear-screen projector having a housing, means within the housing for handling slides, means within the housing for projecting light through the slides along an optical path, a viewing screen onto which the slide images may be projected, at least one mirror located within the housing for folding the optical path, and lens means including two commonly mounted lenses having different focal lengths and means for alternatively bringing one of the lenses into alignment with the optical path.

DESCRIPTION OF THE DRAWINGS

With the above and additional objects and advantages in mind as will hereinafter appear, the invention will be described with reference to the drawings of the preferred embodiment in which:

FIG. 1 is a front perspective view of a rear-screen projector having the invention incorporated therein;

FIG. 2 is a perspective view of the rear-screen projector of FIG. 1 with the slide tray separated from the housing;

FIG. 5 is a perspective view of the lens assembly of this invention; and

FIG. 6 is an exploded perspective view of the interconnect linkage for actuating the lens assembly.

DESCRIPTION OF THE PREFERRED EMBODIMENT

Figure 3:
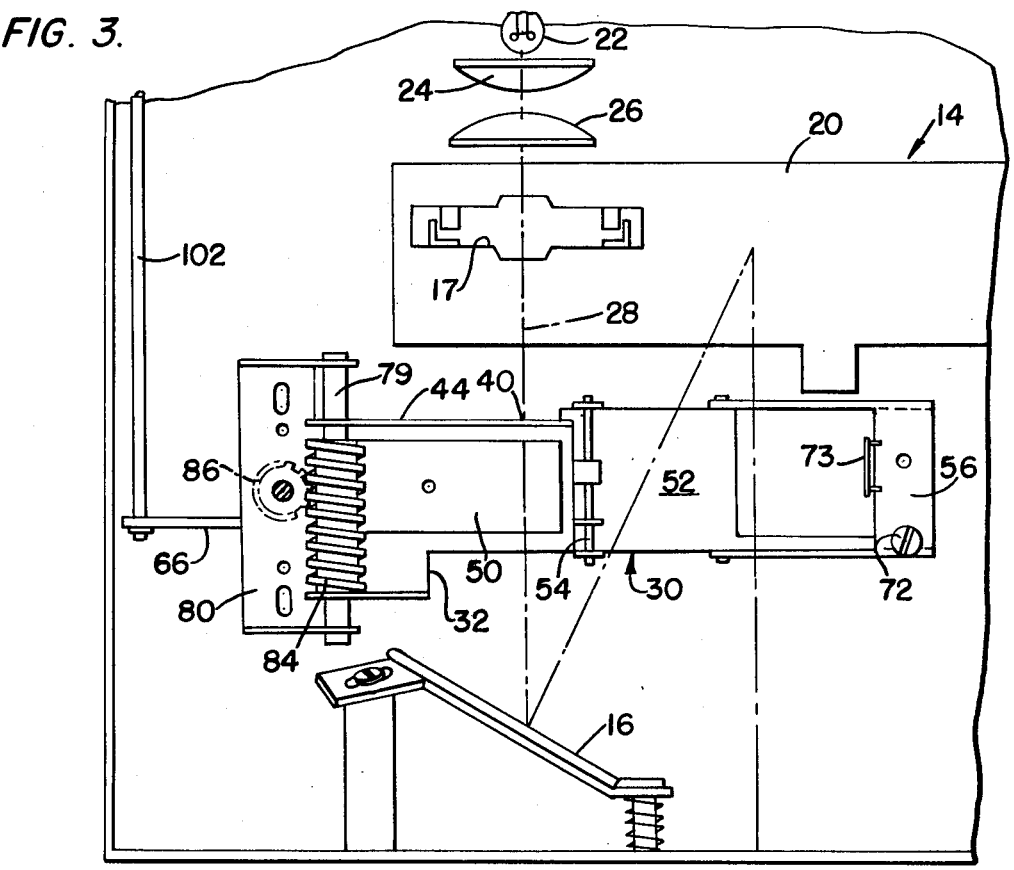
FIG. 3 is a top plan view of the rear-screen housing with the top cover removed by section.

Apparatus which may utilize the present invention is shown in FIG. 1 as comprising a rear-screen projector having a housing 11 in the general shape of a cube. A gravity feed slide tray 12 is removably mounted on the top of the rear-screen projector housing 11. Located within the housing 11 beneath the slide tray 12 is a slide tray and slide positioning mechanism 14 (see FIG. 3). The slide projector projects the images of successive slides in the slide tray 12 onto the rear of a viewing screen 13 contained in the front of the rear-screen projector housing 11. Since the screen 13 is located near the slide being projected, it is necessary that the optical path 28 of the projector be folded one or more times before reaching the screen 13. This is accomplished by the use of one or more mirrors 16 within the housing 11 in a well known manner. This enables a much larger image to be obtained on the viewing screen than could be obtained within the confines of the projector housing 11 without folding the optical path 28 of the projected image.

The gravity feed slide tray 12 and the cooperative relationship between the slide tray 12 and the top of the rear-screen projector housing 11 is substantially identical to that described in U.S. Pat. No. 3,276,156 of Robinson, the disclosure of which is incorporated herein by reference. The slide tray 12 contains a circular disc (not shown) on the bottom thereof having an opening therein through which successive slides, contained in the slide tray 12, may pass. An opening 15 (see FIG. 2) in the top of the rear-screen housing 11 is located above a projector gate 17 within the rear-screen housing 11 and below the opening in the slide tray 12. When indexed, successive slides in the slide tray 12 are positioned over the opening in the slide tray 12, which is located over the opening 15 in the rear-screen housing 11, such that the successive slides are lowered into the projector gate 17 and projected onto the screen 13 of the rear-screen projector and then placed back into the slide tray 12.

The projector gate 17 is located in a slide tray and slide positioning mechanism 14 which is illustrated as including an elongated rectangular housing 20 which may be secured together by any number of well known means. The rectangular housing 20 is mounted to the underside of the top of the rear-screen housing 11 by any number of well known means. The operation of the entire slide tray and slide positioning mechanism 14 is described in detail in U.S. Pat. No. 3,879,112 of Hickey, the disclosure of which is also incorporated herein by reference.

An electric lamp 22 is located behind the projector gate 17 with condenser lenses 24 and 26 being located between the electric lamp 22 and the projector gate 17. Mounted in front of the projector gate 17, in line with the optical path 28 of the projector, is the lens assembly 30 of this invention.

Figure 4:
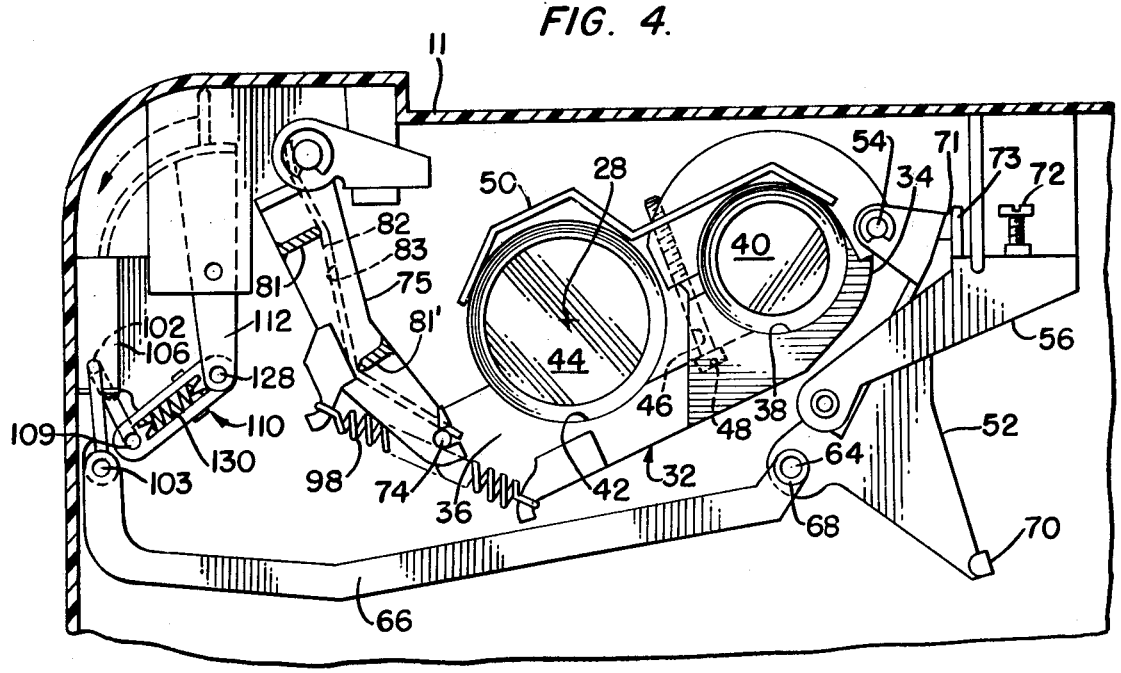
FIG. 4 is a front elevational view of the lens assembly of this invention.

Referring to FIGS. 3, 4 and 5 the lens assembly 30 includes a lens platform 32 having a first end 34 and a second end 36. The lens platform 32 is formed with a first recess 38, located adjacent the first end 34 thereof, for receiving a first objective lens 40, and a second recess 42, located adjacent the second end 36 of the lens platform 32, for receiving a second objective lens 44. A hole 46 is formed through the lens platform 32 midway the two recesses 38 and 42 for receiving a screw 48 which threadingly engages a lens clamp 50 for clamping the objective lenses 40 and 44 to the lens platform 32 (FIG. 3 shows the lens 40 along the optical path 28, FIG. 4 shows the lens 44 along the optical path 28 and FIG. 5 shows the lens platform 32 in an intermediate position).

The first end 34 of the lens platform 32 is pivotally mounted to an actuator 52 on pivot rod 54, on which the lens platform 32 may also be axially shifted. A "U" shaped bracket 56 is fastened to the projector housing 11 by any suitable means. The "U" shaped bracket 56 has two identical legs 58 and 59 depending therefrom which embrace the actuator 52. The legs 58 and 59 have coaxial holes 60 and 61, respectively, formed therethrough which engage a pair of pivot pins 62 and 63, respectively, formed on opposite sides of the actuator 52 near the mid point thereof to enable the actuator 52 to be pivoted about the pins 62 and 63.

The actuator 52 has a pivot pin 64 formed thereon at the opposite end thereof from the pivot rod 54. An actuator link 66 is pivotally attached to the pivot pin 64 and is secured thereto by a retainer 68. A first stop 70 depends from the actuator 52 and engages a stop screw 72 adjustably tapped into the bracket 56. A second stop 71 is formed in the actuator 52 adjacent the pivot rod 54 and selectively engages the bracket 56 on a pad 73 formed thereon.

A pivot rod 74 is attached to the second end 36 of the lens platform 34. A focusing bracket 75 is formed with a pair of open-ended slots 76 and 77 for pivotally engaging the pivot rod 74. The focusing bracket 75 is further formed with a "U" shaped channel 78 in the opposite end thereof for pivotally and shiftably engaging a pivot rod 79 attached to a mounting bracket 80. The mounting bracket 80 is fastened to the projector housing 11 by any suitable means. A leaf spring 82 is nested in a groove 83 formed lengthwise in the focusing bracket 75. When installed, the leaf spring 82 is deformed by a pair of struts 81 and 81' into the shape of a "Z" and engages the pivot rods 74 and 79, retaining the focusing bracket 75 thereto. A rack 84 is formed in the focusing bracket 75 adjacent the channel 78 and is engaged by a pinion 86 which is attached to a focusing knob 88 extending through the projector housing 11. By rotating the focusing knob 88, the action of the pinion 86 in the rack 84 causes the focusing bracket 75 to shift axially along the pivot rod 79, carrying along therewith the lens platform 32 which shifts axially along the pivot rod 54.

The lens platform 32 is formed with a pair of depending tabs 90 and 92 on opposite sides of the second end 36 thereof near the pivot rod 74. The focusing bracket 75 is also formed with a first depending tab 94 and a second depending tab (not shown), located near the pivot rod 74, which are complimental to the tabs 90 and 92, respectively. A first tension spring 98 is stretched between the tabs 90 and 94 and a second tension spring 100 is stretched between the tab 92 and the second depending tab on the focusing bracket 75.

The actuator link 66, which is attached to the actuator 52, spans the lens platform 32 and the focusing bracket 75 and pivotally engages a "U" shaped crank 102 at one end 103 thereof and is held thereon by a retainer 104. The crank 102 is pivotally mounted to a pair of bosses 106 formed in the housing 11 and is held thereto by a pair of retaining leaf springs 108. The other end 109 of the crank 102, opposite from the end 103 to which the actuator link 66 is attached, is pivotally connected to a spring-biased compound interconnect linkage 110, which, in turn, is pivotally connected to a mechanical lever switch 112 having two detent positions. Referring to FIG. 6, the linkage 110 includes two members 113 and 114 identically formed having slots 116 and 118 formed therein and open-ended recesses 120 and 122 formed in one end of each of the members 113 and 114. The members 113 and 114 are oppositely arranged in overlapping relation. Tabs 124 and 126 are formed in the members 113 and 114 respectively, adjacent to the slots 116 and 118, and serve both as linear guide ways and lateral restraints for the respective members 113 and 114. The crank 102 end 109 is inserted in one end of the linkage 110, passing through the slot 116 of the member 113 and resting in the recess 122 of the member 114. The lever switch 112 is formed with a pin 128 which is inserted at the opposite end of the linkage 110 passing through the slot 118 of the member 114 and resting in the recess 120 of the member 113. A compression spring 130 is arranged in the slots 116 and 118 and serves to bias the members 113 and 114 in such a way as will capture the crank 102 end 109 and the switch 112 pin 128 therein. The linkage 110 allows the crank 102 limited motion toward or away from the switch 112 in opposition to the spring 130.

Arranged in the above-described manner, when the switch 112 is in a first detent position, the crank 102 causes the actuator link 66 to pivot the actuator 52 such that the first stop 70 thereon engages the stop screw 72 and the second stop 71 is removed from the pad 73. The actuator 52, in turn, shifts the lens platform 32 to a position in which the first objective lens 40 thereon is in alignment with the optical path 28. When the switch 112 is moved to the second detent position thereof, the crank 102 causes the actuator link 66 to pivot the actuator 52 such the actuator stop 71 engages the pad 73 and the actuator 52, in turn, shifts the lens platform 32 to a position in which the second objective lens 44 thereon is in alignment with the optical path 28. The tabs 90, 94 and 92, 96 are located on the lens platform 32 and the focusing bracket 75 such that the tension springs 98 and 100 act as toggles; that is, when the lens platform 32 is in either of the positions defined by the switch 112, the springs 98 and 100 are under the least amount of tension. During initial movement of the lens platform 32 from one position to the other the springs 98 and 100 are increasingly stretched until the lens platform 32 lies substantially midway the two positions.

To set the lens assembly 30 such that the focus need not be readjusted when changing between the lenses 40 and 44, the switch 112 is moved to the first position thereof and the image on the projection screen 13, projected through the first objective lens 40, is focused by operating the focusing knob 88. The switch 112 is then moved to the second position thereof and the image on the projection screen 13 is then focused by carefully loosening the lens clamp 50 and manually adjusting the second objective lens 44. When the image is in focus, the lens clamp 50 is tightened, thereby establishing a common focus for the two objective lenses 40 and 44.

By using separate lenses having different focal lengths, the quality of the projected image is directly related to the optical quality of the lenses; while, conversely, when a supplemental lens is selectively placed in line with a main lens, the defects in these lenses are additive, thus requiring lenses having higher optical quality to achieve a similar quality projected image. Also it should be noted that the cost for obtaining a single lens having a variable focal length is significantly greater than two separate lenses in which the projected images of the variable lens and the separate lenses are of similar quality.

In operation, an operator initially uses the rear-screen projector with the switch 112 in the second detent position thereof. This brings the second objective lens 44, which may be known as the normal lens, into the optical path 28. By operating the slide tray and slide positioning mechanism 14, the operator causes successive slides found in the slide tray 12 to be lowered into the projection gate 12 and the images contain on the slides to be projected onto the self-contained viewing screen 13. When the operator encounters a slide having a smaller size format, or when the operator desires to magnify the image on the viewing screen 13, the switch 112 is moved to the first detent position, bringing the first objective lens 40, which may be known as the close-up lens, into the optical path 28. This has the effect of filling the viewing screen 13 in the second case, or in the first case, magnifying the central portion of the projected image.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

I claim:

1. Apparatus for projecting images contained on image bearing means comprising
   a housing;
   means within said housing for handling said image bearing means;
   a viewing screen mounted in one face of said housing;
   means within said housing for projecting light through said image bearing means along an optical path to project said images onto said viewing screen;
   at least one mirror located within said housing for folding said optical path;
   lens means for obtaining two different magnifications of the images on said viewing screen including two lenses having different focal lengths;
   toggle means having said lenses mounted thereon and having a first stable position in which one of said lenses is in said optical path and a second stable position in which the other of said lenses is in said optical path;
   means coupled to said toggle means for switching said toggle means between said first and said second stable positions;
   said toggle means including a lens platform having said lenses mounted thereon;
   said lens platform having first and second ends both of which are pivotally mounted in said toggle means
   actuator means pivotally mounted on said housing;
   a first pivot rod mounted on said actuator;
   said first end of said lens platform being pivotally and slidably mounted on said first pivot rod;
   said actuator being pivoted between first and second stop means to establish said first and said second stable positions of said toggle means;
   a second pivot rod mounted on the second end of said lens platform; and
   a focusing bracket having first and second ends;
   said first end of said focusing bracket pivotally coupled to said second pivot rod.

2. The apparatus according to claim 1 wherein said toggle means is slidably mounted within said housing in a direction parallel to at least a portion of said optical axis to enable focusing of the image on said screen.

3. The apparatus according to claim 2 further including
   focusing means on the exterior of said housing connected to said slidable toggle means for focusing the image on said screen.

4. The apparatus according to claim 1 wherein said lenses are mounted on said toggle means in parallel relation one to the other.

5. The apparatus according to claim 1 wherein said means for switching said toggle means includes manually operable means located on the exterior of said housing.

6. The apparatus according to claim 1 wherein said means for switching said toggle means is coupled to said actuator to enable said actuator to be pivoted between said first and said second stop means.

7. The apparatus according to claim 1 wherein said means for switching said toggle means includes a manually operable lever located on the exterior of said housing.

8. The apparatus according to claim 7 further including
   a crank having one end coupled to said actuator and the other end coupled to said lever.

9. The apparatus according to claim 8 further including
   a compound interconnect linkage connected between the other end of said crank and said lever.

10. The apparatus according to claim 1 wherein said toggle means further includes
    a third pivot rod mounted within said housing;
    said second end of said focusing bracket pivotally and slidably mounted on said third pivot rod.

11. The apparatus according to claim 10 wherein said first, second and third pivot rods are parallel to one another and parallel to at least a portion of said optical path.

12. The apparatus according to claim 10 wherein said toggle means further includes
    spring retaining means coupled between said second and third pivot rods and engaging said focusing bracket to retain said focusing bracket in said toggle means.

13. The apparatus according to claim 10 further including
    focusing means coupled to said focusing bracket to enable said focusing bracket to slide along said third pivot rod thereby causing said lens platform to correspondingly slide along said first pivot rod to focus the image on said screen.

14. The apparatus according to claim 13 wherein said focusing means includes
    a rack on said focusing bracket;
    a pinion engaging said rack; and
    a focusing knob on the exterior of said housing mechanically coupled to said pinion to enable rotation of said pinion to focus the image on said screen.

15. The apparatus according to claim 10 wherein said toggle means further includes
    resilient tensioning means coupled between said lens platform and said focusing bracket.

* * * * *